Sept. 15, 1942.   M. HYNDMAN ET AL   2,295,532
FOLDING BOX
Filed July 3, 1940    5 Sheets-Sheet 1
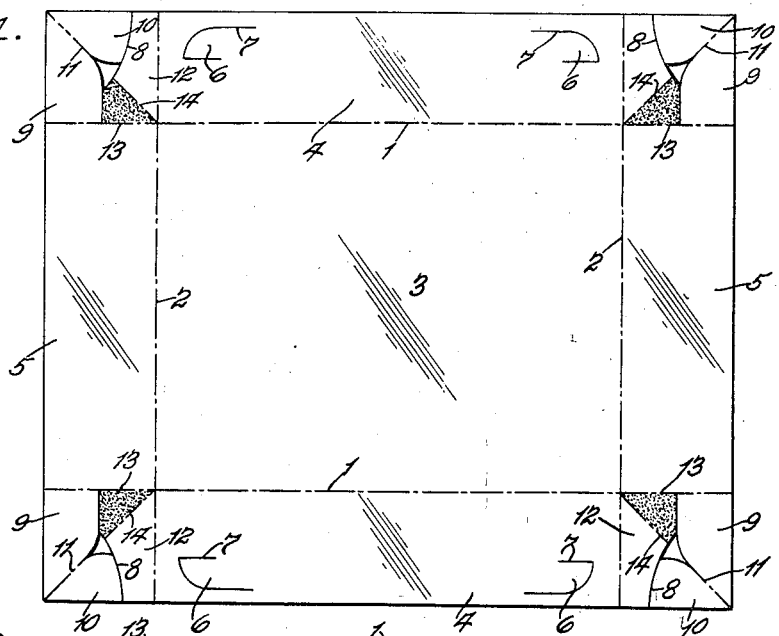
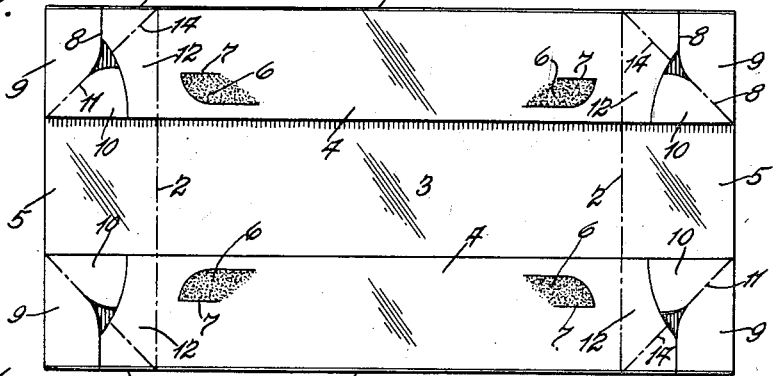
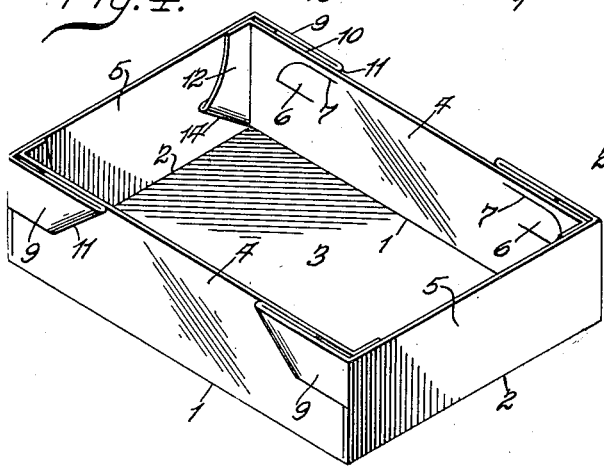
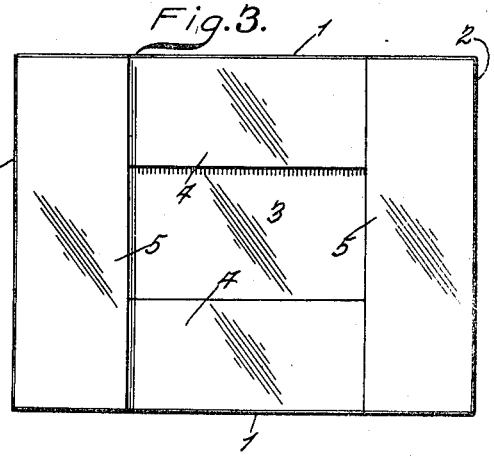
Inventors
Meade Hyndman
Ralph E. Smart
by John D. Rippey
Their Attorney Sept. 15, 1942.  M. HYNDMAN ET AL  2,295,532

FOLDING BOX

Filed July 3, 1940  5 Sheets-Sheet 2

Inventors
Meade Hyndman
Ralph F. Smart
by John D. Rippey
Their Attorney

Sept. 15, 1942.   M. HYNDMAN ET AL   2,295,532
FOLDING BOX
Filed July 3, 1940   5 Sheets-Sheet 3

Inventor
Meade Hyndman
Ralph F. Smart
by John D. Rippey
Their Attorney.

Sept. 15, 1942.   M. HYNDMAN ET AL   2,295,532
FOLDING BOX
Filed July 3, 1940   5 Sheets-Sheet 4
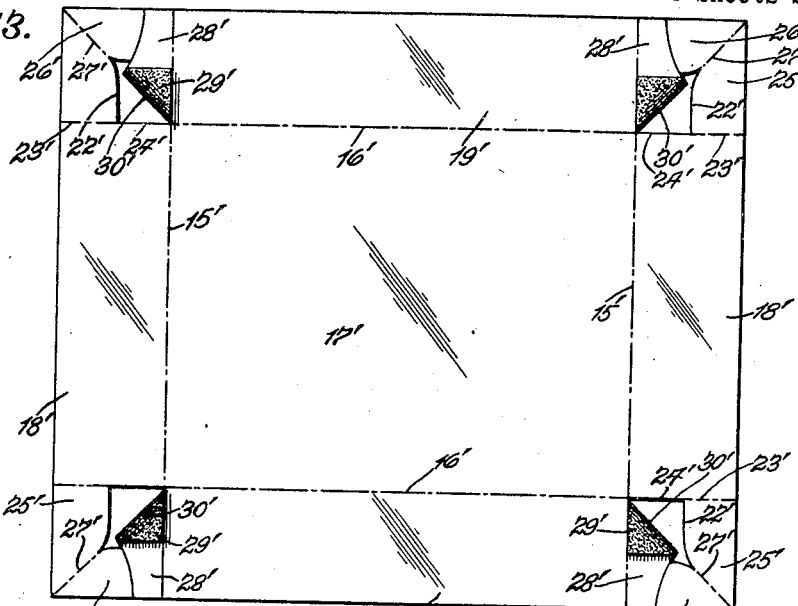
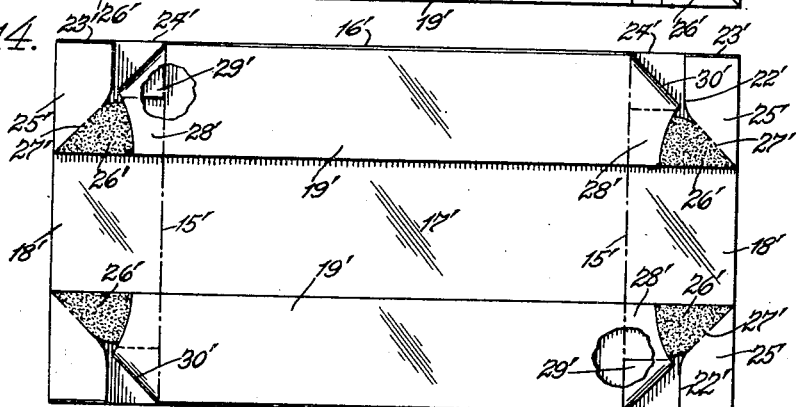
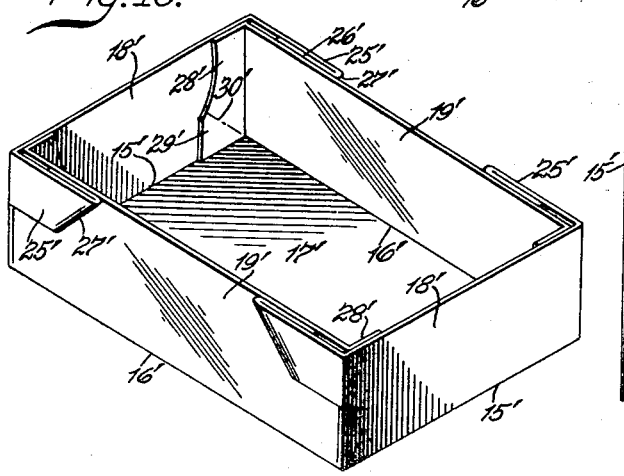
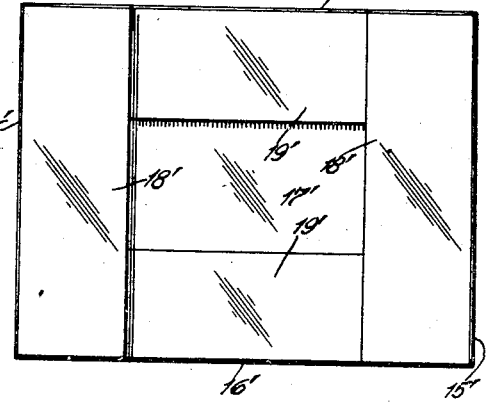
Inventors
Meade Hyndman
Ralph F. Smart
by John D. Rippey
Their Attorney Sept. 15, 1942.  M. HYNDMAN ET AL  2,295,532
FOLDING BOX
Filed July 3, 1940   5 Sheets-Sheet 5
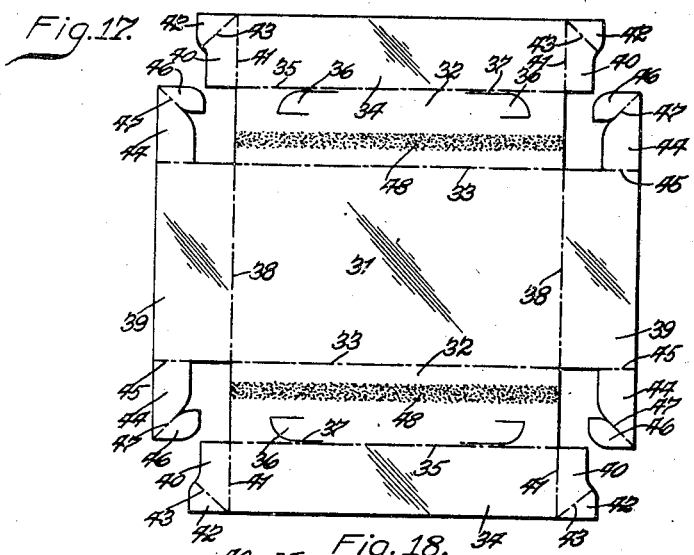
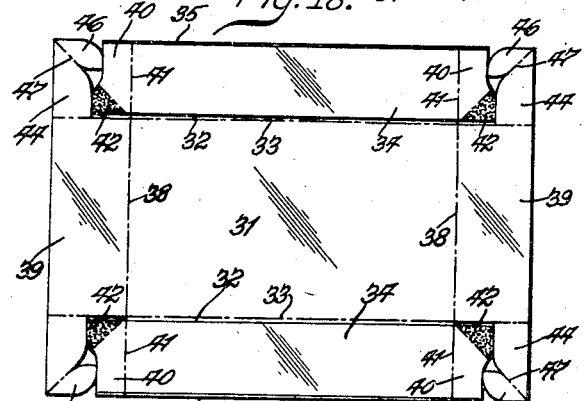
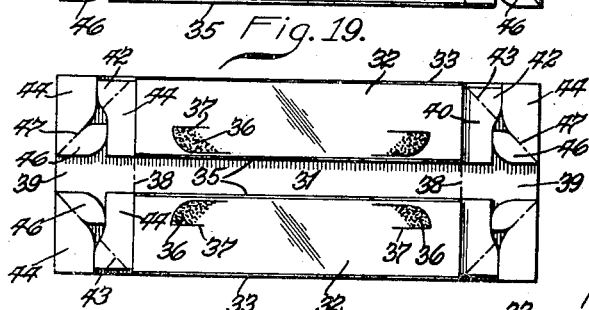
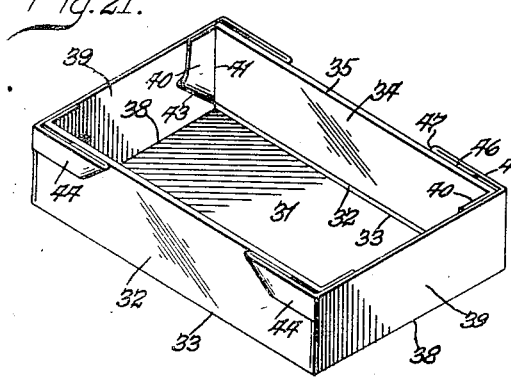
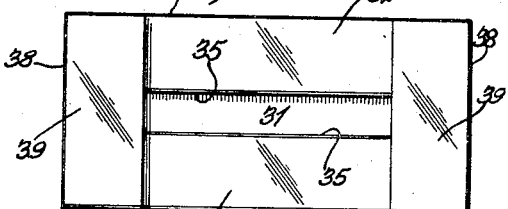
Inventors
Meade Hyndman
Ralph F. Smart
by John D. Rippey
Their Attorney Patented Sept. 15, 1942

2,295,532

UNITED STATES PATENT OFFICE 2,295,532

FOLDING BOX

Meade Hyndman and Ralph F. Smart, St. Louis, Mo., assignors to said Hyndman

Application July 3, 1940, Serial No. 343,680

3 Claims. (Cl. 229—32)

This invention relates to folding boxes; and has special reference to folding boxes made of cardboard or paper box board or other materials of that general nature.

Objects of the invention are to provide a folding box composed of a blank of cardboard or paper box board or other material suitable for the purpose and which may be easily made up in folded condition and the side and end walls thereof attached at adjacent corners by box making machines of the type now in general use; to provide a box having novel and more efficient hinge structures attaching adjacent ends of the side and end walls and including rebent or doubled hinge tabs on the opposite ends of opposite walls, the rebent or doubled portions of said tabs being attached to the outer surfaces of the adjacent walls and unattached to the bodies of the tabs excepting along the rebent or doubled edge thereof; to provide means embodied in the hinge attaching devices affording a relative movement of the parts without subjecting any of the attached parts to excessive strain, thereby permitting the use of relatively thick or heavy material in forming the box; and to provide an improved box of this general type having a reinforcing and strengthening wall structure in connection with opposite walls thereof to strengthen and reinforce the box in its open form.

Other objects will appear from the following description, reference being made to the annexed drawings, in which—

Fig. 1 is a plan view of an open blank for making one form of our improved box.

Fig. 2 is a plan view after the side walls of the blank have been folded over upon the bottom.

Fig. 3 is a plan view of the completed folded box.

Fig. 4 is a perspective view of the box in open form.

Fig. 13 is a plan view of an open blank for making another specific form of our improved box.

Fig. 14 is a plan view showing the side walls of this blank folded over upon the bottom, and showing a portion of the hinge structure attaching the ends of the side walls to the inner sides of the end walls.

Fig. 15 is a plan view of the completed folded box.

Fig. 16 is a perspective view of this box in its open form.

Fig. 17 is a plan view of an open blank for making another form of our improved box, in which the inner plies of the side walls are hinged to the inner sides of the end walls and the end walls have hinge connection with the outer plies of the side walls.

Fig. 18 is a plan view of the blank showing the inner sides of the side walls folded over upon the inner surfaces of the outer plies.

Fig. 19 is a plan view showing the double-ply side walls folded over upon the bottom of the blank.

Fig. 20 is a plan view of the completed folded box.

Fig. 21 is an open perspective view of this type of box.

Figure 5:
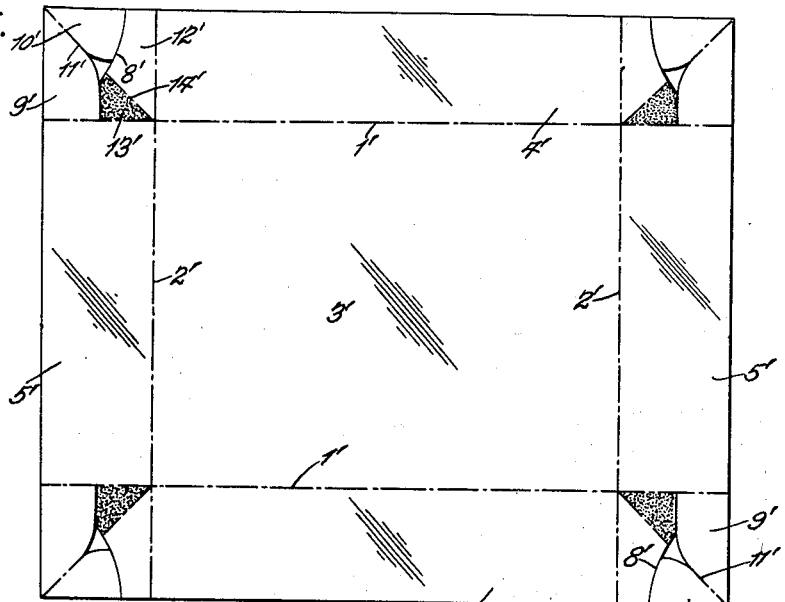
Fig. 5 is an open plan view of a blank for forming a box without resilient tongues in the hinge attaching devices.

The blank shown in Fig. 1 for making the box shown in Fig. 4 is composed of cardboard or paper box board or other appropriate material. This blank is formed with two parallel scores 1 extending throughout the length of the blank; and is formed with two parallel scores 2 at right angles to the scores 1 and extending throughout the width of the blank. The scores 1 and 2 extend along the edges of the bottom 3 and constitute hinges for the side walls 4 and the end walls 5 of the box. Resilient tongues 6 are formed in the end portions of the side walls 4 by slits 7.

Curved cuts 8 extend from the edges of the blank to the scores 1 near each corner, and are spaced outwardly beyond the scores 2. These cuts provide at each corner of the blank hinge attaching tabs for attaching the end walls 5 to the tongues 6, and for attaching the side walls 4 to said end walls. The hinge tabs for attaching the end walls 5 to the tongues 6 comprise portions 9 integrally connected with portions 10 along a diagonal hinge line 11. The hinge tabs for attaching the side walls 4 to the end walls 5 comprise portions 12 and portions 13 integrally connected with the side walls 4 and the end walls 5 and defined from each other by hinge scores 14 extending from the corners formed by the intersections of the scores 1 and 2.

In making a box from this blank, the hinge portions 13 are coated with adhesive as shown, after which the side walls 4 together with the hinge attaching tabs at the corners of the blank are folded over upon the bottom 3 and the end walls 5, as shown in Fig. 2. Sufficient pressure is applied to cause the adhesive upon the hinge attaching portions 13 to adhere to the inner surfaces of the end walls 5. Then the direction of movement of the blank through the box forming machine is changed and the walls 5 together with the hinge attaching tabs in connection therewith are folded over upon the end walls 4 after adhesive has been applied to the exposed surfaces of the tongues 6, as shown (Fig. 2). Sufficient pressure is applied to cause the portions 10 of the attaching hinges to become adhesively attached to the tongues 6, leaving the blank folded in the form shown in Fig. 3. The box may be opened by raising the walls 5 and 4 to the position shown in Fig. 4, causing the hinge attaching tabs 9, 10 to fold along the lines 11, and placing the portions 10 between the walls 4 and the portions 9 of said tabs; and causing the hinge attaching tabs 12, 13 to fold along the lines 1 and 14, placing the portions 13 between the end walls 5 and the portions 12 of said tabs. This provides a box substantially sealed at its corners by the integral attachment of the tab portions 13 to the end walls 5 up to the lower edges of the tab portions 9, which are also integrally united with said end walls. Since the rebent or doubled hinge portions 10 are unattached to the covering portions 9 excepting along the hinge lines 11 and are attached directly to the resilient tongues 6, yielding or expansible hinges are provided, permitting the use of heavier or thicker materials in the making of these boxes than would otherwise be permissible. In this type of box, the portions 10 of the attaching hinges are secured only to the tongues 6, and are not secured to other portions of the walls 4.

Figure 6:
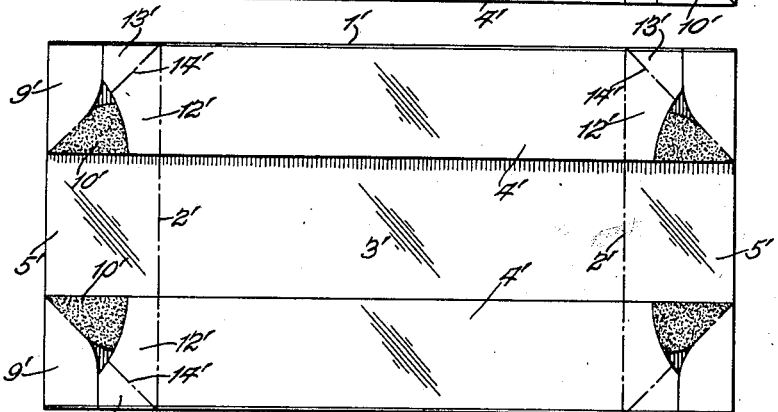
Fig. 6 is a plan view showing the side walls folded over upon the bottom.
Figure 8:
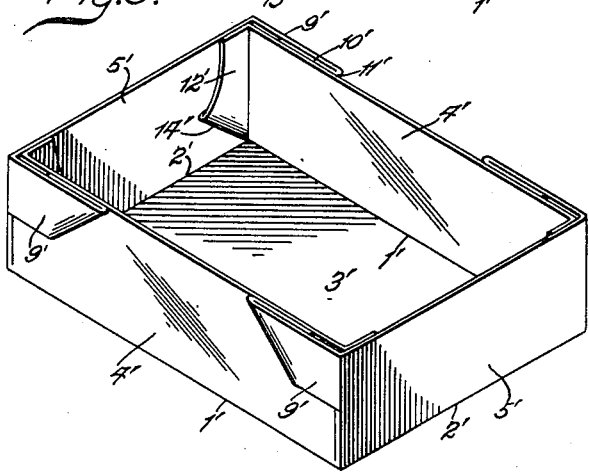
Fig. 8 is a perspective view of the open box.
Figure 7:
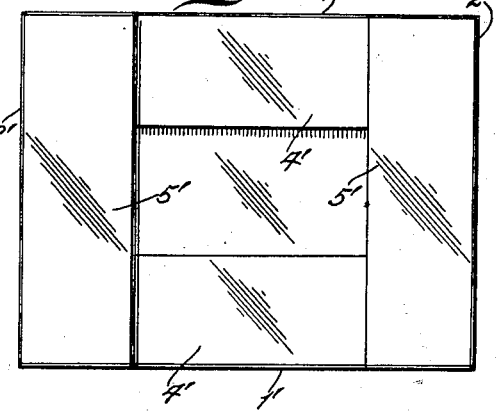
Fig. 7 is a plan view of the completed folded box.

The cardboard or paper box board blank shown in Fig. 5 for making the box shown in Fig. 8 is of the same form and structure as the blank shown in Fig. 1, with the exception that the slits 7 are omitted, as a consequence of which there are no resilient tongues 6 in said blank of Fig. 5. Since all parts of the blank of Fig. 5 with this exception are the same in form and function as like parts in Fig. 1, the same reference numerals with exponents are applied thereto. After the walls 4' are folded over upon the bottom 3' to the position shown in Fig. 6, the exposed surfaces of the hinge portions 10' are coated throughout with adhesive. Then, when the end walls 5' are folded inwardly upon the walls 4', the adhesive coats on the attaching hinge portions 10' secure the latter directly to the outer surfaces of the side walls 4'.

This box may be opened by raising the walls 5' and 4', causing the hinge attaching tabs 9' and 10' to fold along the lines 11' and placing the portions 10' between the walls 4' and the portions 9' of said tabs while the hinge attaching tabs 12', 13' fold along the lines 1' and 14', thereby placing the portions 13' between the end walls 5' and the portions 12' of said tabs. This provides a box substantially sealed at its corners by the integral connection of the tab portions 13' with the end walls 5' up to the lower edges of the tab portions 9', which are also integrally united with said end walls. The rebent or doubled hinge portions 10' are unattached to the covering portions 9' excepting along the hinge lines 11', and are directly attached throughout their areas to the outer surfaces of the walls 4'.

Figure 9:
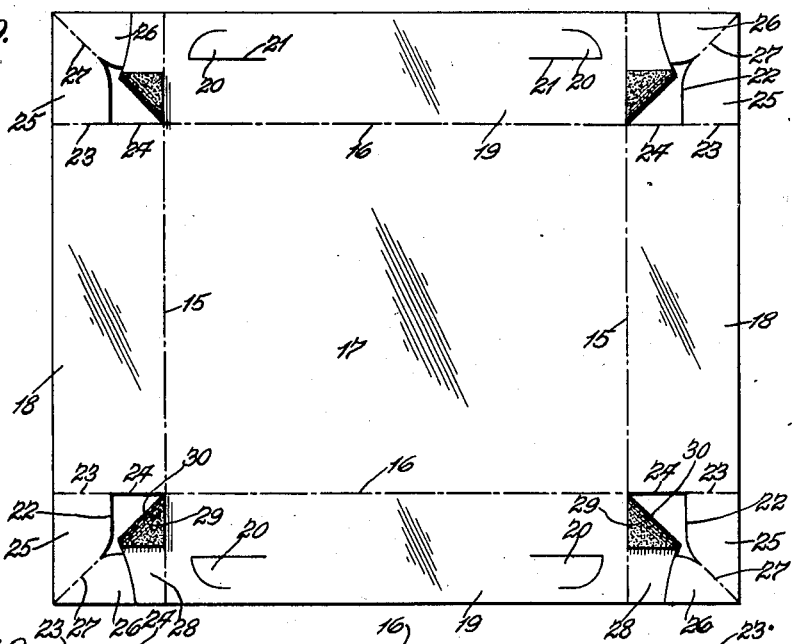
Fig. 9 is a plan view of an open blank for forming a box with a portion of the hinge attachments arranged differently from the hinge attachments shown in the preceding views of the drawings.
Figure 12:
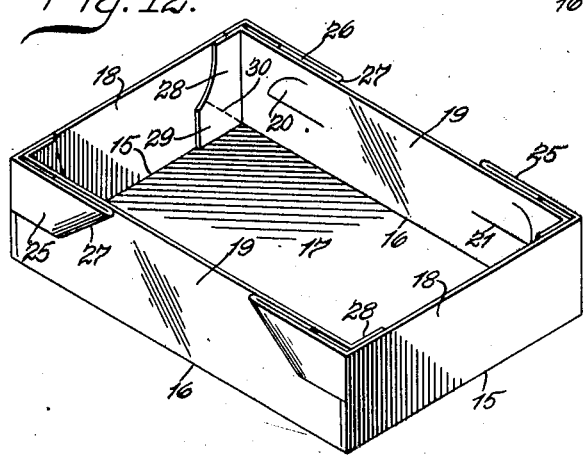
Fig. 12 is a perspective view of this box in open form.
Figure 11:
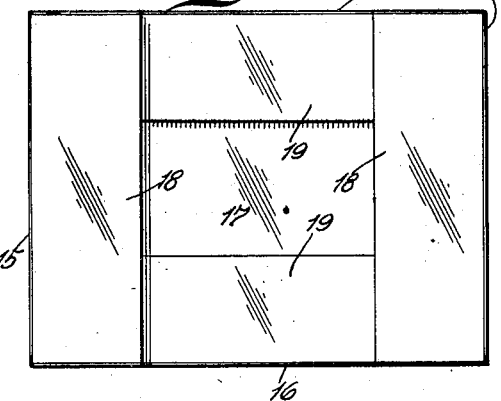
Fig. 11 is a plan view of the completed folded box.

The blank shown in Fig. 9 is used to make the folding box shown in Fig. 12. Said blank is formed with two parallel scores 15 extending throughout the width of the blank; and is formed with two parallel scores 16 extending between the lines 15 to intersection therewith. The score lines 15 and 16 extend along the edges of the bottom 17 and constitute hinges for the end walls 18 and the side walls 19 of the box. Resilient tongues 20 are formed in the end portions of the side walls 19 by slits 21.

Curved cuts 22 extend from the edges of the blank to the scores 23, which are in approximate alinement with the scores 16 and are at the ends of the end walls 18. From the slits 20, slots 24 extend to the scores 15. The slots 24 have a width approximately equal to the thickness of the material to provide a tolerance or space for the thickness of the material, as will presently appear.

The cuts 22 and slots 24 provide at each corner of the blank hinge attaching tabs for attaching the end walls 18 to the side walls 19 and for attaching said side walls to said end walls. The hinge tabs for attaching the end walls 18 to the side walls 19 comprise portions 25 integrally connected with portions 26 along diagonal hinge lines 27. The hinge tabs for attaching the side walls 19 to the end walls 18 comprise portions 28 integrally connected with the side walls 19, and portions 29 formed by the cuts 22, the slots 24, and diagonal scores 30, leaving said portions 29 integrally united with the portions 28 and unattached to any other portion of the blank.

Figure 10:
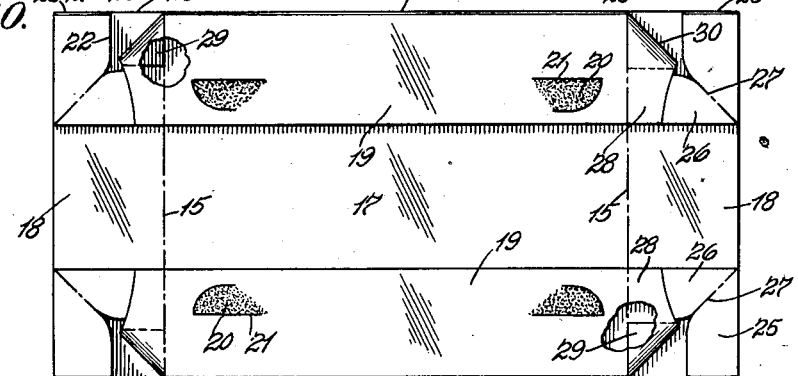
Fig. 10 is a plan view showing the side walls folded over upon the bottom of the box and the hinge structure for attaching the ends of the side walls to the inner sides of the end walls.

To make a box from this blank, the hinge portions 29 are folded along the scores 30 against the inner surfaces of the portions 28, as indicated at the lower side of Fig. 9, and the exposed surfaces of said portions 29 are then coated with adhesive as shown. After the hinge portions 29 have been folded along the scores 30 and coated with adhesive, the side walls 19 together with the hinge attaching tabs at the corners of the blank are folded over upon the bottom 3 and the end walls 18, as shown in Fig. 10. Enough pressure is applied to cause the hinge portions 29 to adhere closely to the end walls 18. Then the direction of movement of the blank through the box forming machine is changed, and the walls 18 together with the hinge attaching tabs in connection therewith are folded over upon the side walls 19 after adhesive has been applied to the exposed surfaces of the tongues 20, as shown in Fig. 10. Pressure is applied to cause the portions 26 to become adhesively attached to the resilient tongues 20, leaving the blank folded as in Fig. 3. Because of the fact that the hinge attaching portions 26 are secured only to the resilient tongues 20, the necessary relative movement of the parts is afforded when the box is opened or closed. The box may be opened by raising the walls 18 and 19 to the position shown in Fig. 12, causing the hinge attaching tabs 28 and 29 to unfold along the scores 30, and causing the hinge attaching tabs 25, 26 to fold along the scores 27, placing the portions 26 between the walls 19 and the portions 25 of said tabs. Thus, a box is provided that is substantially sealed at its corners by the integral attachment of the tabs 28 to the side walls 19 and by the integral attachment of the tabs 25 to the end walls 18 above the portions 29. Since the rebent or doubled hinge portions 26 are unattached to the covering portions 25 of the hinge tabs excepting along the scores 27 and are attached directly to the resilient tongues 20, and are otherwise unattached to the side walls, yielding or expansible hinges are provided, permitting the use of heavier or thicker materials in these boxes than would otherwise be permissible.

The cardboard or paper box board blank shown in Fig. 13 for making the box shown in Fig. 16 is of the same form and structure as the blank shown in Fig. 9, with the exception that the slits 21 and the tongues 20 are omitted. Since the remaining parts of the blank shown in Fig. 13 with this exception are of the same form and function as do the parts shown in Fig. 9, the same reference numerals with exponents are applied thereto. After the attaching portions 29' are folded along the scores 30' and are coated with adhesive, the side walls 19' together with the hinge attaching tabs at the corners of the blank are folded over upon the bottom 17' and the end walls 18', as shown in Fig. 14, thereby adhesively securing the attaching portions 29' to said end walls. The hinge attaching portions 26' are then coated with adhesive, after which the end walls 18' are folded over upon the side walls 19' to attach said portions 26' directly to the outer surfaces of the walls 19'.

This box may be opened by raising the walls 18' and 19', causing the hinge attaching portions 25' and 26' to fold along the scores 27' and placing said portions 26' between the side walls 19' and the portions 25' of said tabs, while the hinge attaching portions 28' and 29' unfold along the scores 30'. This provides a box substantially sealed at its corners by the tab portions attaching the end walls thereof. The attaching portions 29' seat on the bottom 17' when the box is opened (Fig. 16) and function positively to support the side and end walls vertically, prevent said walls from loosely moving inwardly, and hold the parts 25', 26' and 19' in close sealing contact.

The cardboard or paper box board blank shown in Fig. 17 provides a box having at least two of its opposite walls of double-ply thickness and yet including resilient hinge attaching structure permitting the box to be folded or opened easily, and also sealing the box at the corners. This type of box is designed and adapted for use as a container for materials or articles requiring substantially strong walls. This blank comprises a bottom 31 integrally hinged to outer side wall plies 32 along longitudinal hinge scores 33. The side walls 32 are integrally connected with inner side wall plies 34 along scored fold lines 35 parallel with the hinge scores 33. The inner plies 34 are of slightly less width than the outer plies 32, the difference being approximately that of the thickness of the material of which the blank is formed. Resilient tongues 36 are formed in the end portions of the outer plies 32 by slits 37.

Transverse hinge scores 38 extend along the ends of the bottom 31 and form integral connections for the end walls 39. The hinge scores 38 are in alinement with the ends of the outer wall plies 32. The hinge tabs for attaching the side walls to the end walls 39 comprise portions 40 integrally connected with the ends of the inner plies 34 along hinge scores 41 and having integral connection with attaching portions 42 along diagonal scores 43. The hinge tabs for attaching the end walls 38 to the side walls comprise portions 44 extending from the ends of the side walls 39 and defined therefrom by hinge scores 45 in approximate alinement with the hinge scores 33, and portions 46 formed in connection with the ends of the portions 44 and defined therefrom by scores 47.

In making a box from this blank, the inner plies 34 of the side walls are folded over upon the inner surfaces of the outer plies 32 after a quantity of adhesive has been placed to attach said inner plies and outer plies together. As shown in Fig. 17, adhesive 48 has been placed upon the inner surfaces of the outer plies 32 so that, when the inner plies 34 are folded thereon as in Fig. 18, the two plies at each side of the blank will be attached together. This attachment is formed so as to leave the resilient tongues 36 unattached to the inner plies and free for bending movement. After the inner plies 34 have been folded inwardly upon and attached to the outer plies 32, adhesive is applied to the exposed surfaces of the tab portions 42. Then, during continuous movement of the blank through the machine, the side walls comprising the attached outer plies 32 and inner plies 34, together with the hinge attaching tabs in connection with the ends of the inner plies 34, are folded inwardly upon the bottom 31. This places the hinge attaching tabs 40, 42 upon the upper surfaces of the end walls 38 to which said hinge attaching tabs are secured by the adhesive on the portions 42 thereof. Then, the exposed surfaces of the resilient tongues 36 are coated with adhesive after which the end walls 38 are folded over upon the outer plies 32 of the side walls, in which position the hinge attaching portions 46 are engaged and secured by the adhesive upon said tongues 36. The box folded in this position is shown in Fig. 20.

The box may be opened by raising the end walls 38 and the double-ply side walls from the position shown in Fig. 20 to the position shown in Fig. 21, causing the hinge attaching tabs 44, 46 to fold along the scores 47, and placing the portions 46 between the outer wall plies 32 and the portions 44 of said tabs; and causing the hinge attaching tabs 40, 42 to fold along the scores 43, placing the portions 42 between the end walls 38 and the portions 40 of said tabs. This provides a strong collapsible box sealed at its corners by the arrangement and relationship of the attaching tabs. Since the rebent or doubled hinge portions 46 are unattached to the portions 44 excepting along the scores 47, and are attached directly to the resilient tongues 36, and otherwise unattached to the side walls, yielding or expansible hinges are provided, permitting the use of heavier, stronger or more rigid materials in the making of these boxes than would otherwise be permissible.

It should now be apparent that this invention attains all of its several objects and purposes efficiently, economically, and satisfactorily. The box may be made by use of the present available box forming machines without the provision of special attachments other than for the application of the adhesive to the different parts as required. Therefore, this improved box supplies an existing need in a practical manner. The construction and arrangement of the box may be varied otherwise than as specifically shown and described without departure from the nature and principle of the invention.

We claim:

1. In a folding box having a bottom, side walls hinged to said bottom and including inner and outer plies of material adjacently disposed and attached together along their upper margins, resilient tongues integral with said outer plies, hinge tabs connecting said inner plies and said end walls and being unattached directly to said outer plies, and hinge tabs integral with said end walls and attached to said resilient tongues and being otherwise unattached to said outer plies.

2. A folding box comprising a bottom, end walls having hinge connection with said bottom, outer side wall plies having hinge connection with the sides of said bottom, inner side wall plies attached to said outer plies at spaced points of attachment, tabs integral with said inner plies having portions thereof attached to the inner sides of said end walls, and tabs integral with said end walls attached to said outer plies, all of said tabs leaving said walls free to be folded inwardly in superimposed relationship upon said bottom and raised vertically to open box form as desired.

3. In a folding box having a bottom, and side and end walls hinged to said bottom for swinging movements from folded positions upon said bottom to upwardly extended positions and vice versa; hinged tabs having integral connection with the ends of said side walls and including portions attached to the inner sides of the lower end margins of said end walls, tabs integral with said end walls having rebent portions enclosed between the remaining portions of said last named tabs and the outer surfaces of said side walls, and resilient tongues having their respective inner ends only integral with said side walls and having their opposite ends unattached to said side walls and secured to said rebent portions of said last named tabs.

MEADE HYNDMAN.
RALPH F. SMART.